United States Patent

Quirke et al.

(10) Patent No.: US 7,181,224 B2
(45) Date of Patent: Feb. 20, 2007

(54) COMMUNICATIONS SYSTEMS AND METHOD OF TRANSMITTING INFORMATION

(75) Inventors: Thomas Michael Quirke, Swindon (GB); Rene Pihl Jepsen, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 574 days.

(21) Appl. No.: 10/451,817

(22) PCT Filed: Jan. 21, 2002

(86) PCT No.: PCT/EP02/00768

§ 371 (c)(1),
(2), (4) Date: Jun. 25, 2003

(87) PCT Pub. No.: WO02/074000

PCT Pub. Date: Sep. 19, 2002

(65) Prior Publication Data

US 2004/0043772 A1 Mar. 4, 2004

(30) Foreign Application Priority Data

Jan. 27, 2001 (GB) ................................. 0102176.5

(51) Int. Cl.
*H04Q 7/20* (2006.01)
(52) U.S. Cl. .................................... 455/452.1; 455/450
(58) Field of Classification Search ............ 455/452.1, 455/436, 437, 440, 441, 444, 450, 452, 100, 455/456

See application file for complete search history.

(56) References Cited

U.S. PATENT DOCUMENTS

| 5,913,168 A | * | 6/1999 | Moreau et al. ............. 455/441 |
| 6,014,564 A | | 1/2000 | Donis et al. |
| 6,125,278 A | | 9/2000 | Wieczorek et al. |
| 6,385,454 B1 | * | 5/2002 | Bahl et al. .................. 455/450 |

FOREIGN PATENT DOCUMENTS

EP     1 081 974 A2    3/2001

OTHER PUBLICATIONS

Katzela, I. et al. "Channel Assignment Schemes for Cellular Mobile Telecommunication Systems: A Comprehensive Survey." *IEEE PersonalCommunications Society, US* ; vol. 3, No. 3, Jun. 1996, pp. 10-31.

* cited by examiner

*Primary Examiner*—Duc M. Nguyen
*Assistant Examiner*—My Nguyen
(74) *Attorney, Agent, or Firm*—Lalita W. Pace; Brian M. Mancini

(57) ABSTRACT

Media access control in known communications systems relies upon an initial position of a mobile terminal and one or more Quality of Service parameters. In order to improve the quality of allocation of resources, the present invention provides a communications system and a method therefor for allocating resources in response to the mobile terminal (110) following a predicted path (113) to an optimum location (116) where the radio environment is better than the radio environment at the initial location (112).

7 Claims, 2 Drawing Sheets

COMMUNICATIONS SYSTEMS AND METHOD OF TRANSMITTING INFORMATION

BACKGROUND TO THE INVENTION

The present invention relates to mobile communication systems and particularly to communication of information from one communications device to another, the information having a time period associated therewith corresponding to a tolerable delay associated with transmission of the information.

SUMMARY OF THE PRIOR ART

The Universal Mobile Telecommunications System (UMTS) currently under standardisation will support a combination of different service types and data rates for the transmission of information. Distinct communication channels are defined by separation of codes used by a Wideband-Code Division Multiple Access (W-CDMA) scheme and/or a Time Division-Code Division Multiple Access (TD-CDMA) scheme employed by the UMTS. A UMTS network comprises a plurality of base stations referred to as Node Bs, each Node B supporting a respective cell. Capacity within the each respective cell is interference limited and so as the number of users increases in a given cell, interference levels increase as well. In order to balance needs of a particular user against needs of other users supported in the given cell, Medium Access Control (MAC) is provided to manage allocation of resources (channels), i.e. balance aggregate capacity against individual user capacity.

Some known MAC algorithms take into account acceptable delay associated with a service and Quality of Service (QoS) parameters of a call in order to determine when to release a resource, the release of the resource being based on a number of factors, for example cell loading, call priority, or prevailing radio conditions. "Channel Allocation Schemes for Cellular Mobile Telecommunications: A Comprehensive Survey" by I Katzela and M Naghshneh (IEEE Personal Communications, June 1996 pages 10–31) describes use of a current location of a mobile terminal in conjunction with QoS parameters in order to determine when to release the resource. However, if the mobile terminal is moving, an optimum instant for releasing the resource may no longer be the optimum instant, because a radio environment in which the mobile terminal is located varies as the mobile terminal moves.

SUMMARY OF THE INVENTION

According to a first aspect of the present invention there is provided a method of transmitting information between a mobile terminal and a communications device, the information having a time period associated therewith corresponding to a tolerable delay associated with transmission of the information, the method comprising the steps of: making a prediction of subsequent locations of the mobile terminal to which the mobile terminal is anticipated to move from a previous location during the time period; determining whether a subsequent location is an optimum location for transmitting the information between the mobile terminal and the communication device, and withholding an allocation of a resource for transmitting the information between the mobile terminal and the communications device until the mobile terminal reaches the optimum location.

Hence, release of resources for transmission of the information can be withheld until the mobile terminal has reached an optimum location having a favourable environment for the reception and/or transmission of data.

If it is predicted that the mobile terminal will never reach the optimum location, then the resources are released at any time within the tolerable delay period.

If it is predicted that the mobile station is heading for a location having a less favourable environment then the one it is already in, then the resources are released without delay.

The step of predicting a subsequent location may comprise the use of Doppler shift measurements, pathloss measurements, a global positioning system and/or maps.

The optimum location may be defined as being a radio environment having at least one optimum quality of service parameter.

The communication device may be a base station or "Node B" forming part of a mobile communications system. The base station may be fixed or supported on a moving or moveable platform, eg satellite.

The method may further comprise the steps of: predicting a subsequent location of the communications device, and allocating the resource in response to the mobile terminal being at the optimum location as a result, at least in part, of movement of the communications device.

According to a second aspect of the present invention, there is provided a resource controller, the resource controller being arranged to determine a first location of a mobile terminal and predict subsequent locations of the mobile terminal to which the mobile terminal is anticipated to move from the first location during a time period corresponding to a tolerable delay associated with transmission of information between the mobile terminal and a communication device; wherein the resource controller is arranged to withhold an allocation of a resource for transmitting the information between the mobile terminal and the communications device until the mobile terminal reaches the optimum location prediction.

The present invention also provides a computer program product comprising a medium on or in which is recorded a program, which, when executed in a computer-controlled system will perform any of the methods recited herein.

It is thus possible to provide a method and system, with improved resource allocation ability, for transmitting information between devices. Additionally, the method can be easily incorporated into existing systems in the form of an upgrade. The information can therefore be transmitted at an optimum opportunity during the time period associated with the information, thereby improving the likelihood of accurate receipt of the information.

BRIEF DESCRIPTION OF THE DRAWINGS

At least one embodiment of the invention will now be described, by way of example only, with reference to the accompanying drawings, in which.

DETAILED DESCRIPTION OF A PREFERRED EMBODIMENT

Figure 1:
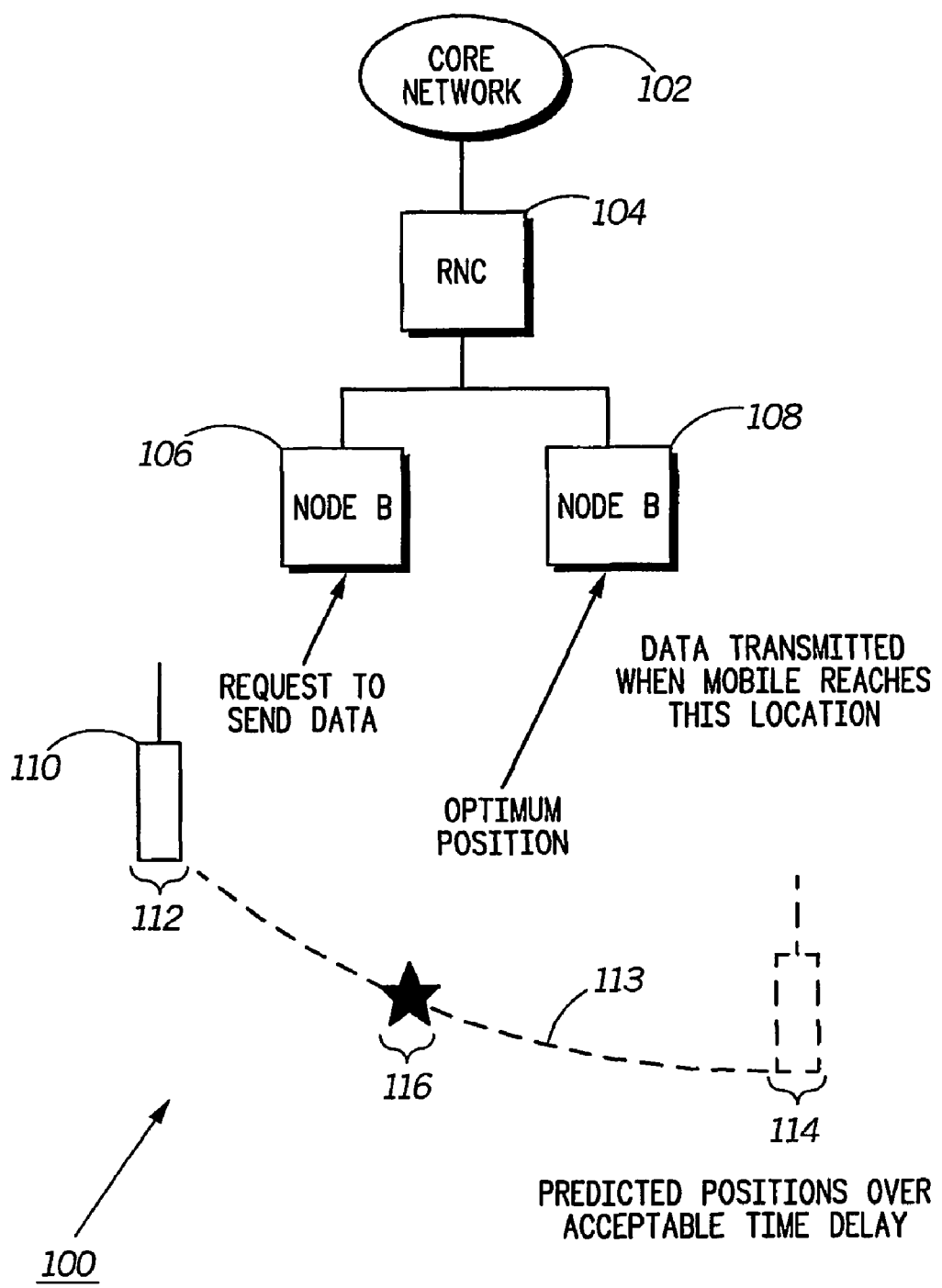
FIG. 1 is a schematic diagram of a communications system constituting an embodiment of the present invention.

Throughout the description, like parts will be identified by identical reference numerals.

Referring to FIG. 1, a UMTS network 100 comprises a core network 102 operably coupled to a Radio Network Controller (RNC) 104, the RNC 104 being coupled to a first Node B 106 and a second Node B 108. A mobile terminal 110 is situated at an initial location 112 and is capable of communicating with the first Node B 106.

The above communication system will now be described in the context of the mobile terminal 110 following an actual path starting from the initial location 112 having an initial radio environment associated therewith.

Figure 2:
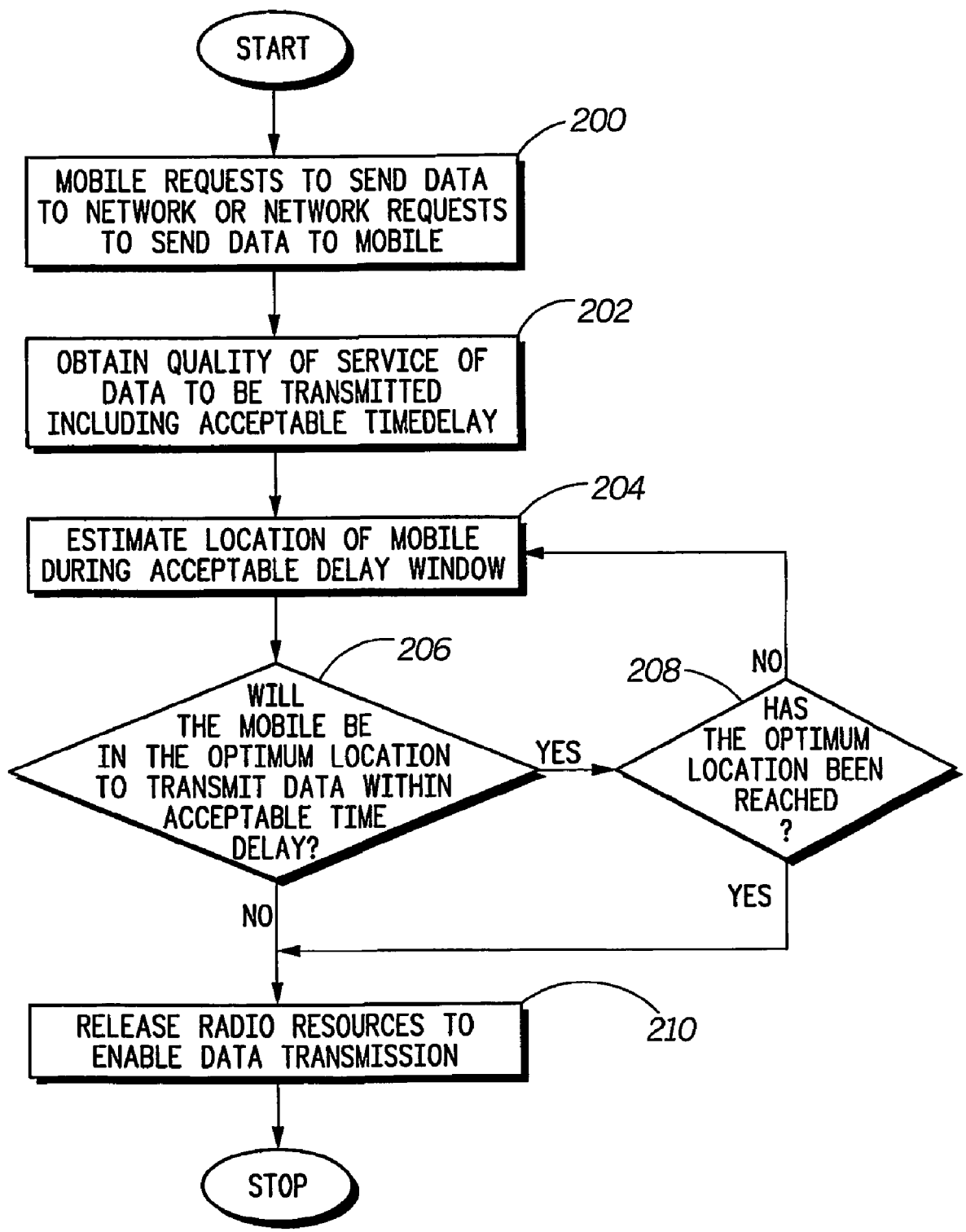
FIG. 2 is a flow diagram of a method for use with the system of FIG. 1.

In operation (FIG. 2), the mobile terminal 110 requests transmission of data to the core network 102 for onward routing (step 200). Alternatively, the core network 102 can request transmission of data to the mobile terminal 110, the data being received by the core network 102 from another mobile terminal (not shown) or another host entity (not shown) capable of communicating data through the core network 102 for receipt by the mobile terminal 110.

The RNC 104 supports a MAC algorithm, the MAC algorithm determining (step 202) a period of time corresponding to an acceptable time delay for the communication of the data between the first Node B 106 and the mobile terminal 110. Additionally, other QoS parameters can be ascertained by the MAC algorithm, for example, by association or encapsulation with the request to transmit data (step 200). Examples of the other QoS parameters are: a peak data rate or a tolerable Bit Error Rate (BER) associated with the communication of the data between the first Node B 106 and the mobile terminal 110.

The MAC algorithm then estimates (step 204) the initial location 112 of the mobile terminal 110 and predicts a path 113 being followed by the mobile terminal 110 using one or more radio parameter corresponding to a location and/or direction, for example Doppler shift, path loss, an Enhanced Observed Time Difference technique, or a Global Positioning Satellite (GPS) signal.

The MAC algorithm then determines (step 206) whether any point along the predicted path 113 predicted by the MAC algorithm is an optimum location 116. The optimum location corresponds, for example, to a location having an improved radio environment over the initial radio environment at the initial location 112. If a point on the predicted path 113 corresponds to the optimum location 116, the MAC algorithm determines (step 208) whether the mobile terminal 110 has reached the optimum location, assuming that the mobile terminal follows the predicted path 113. If the mobile terminal has not reached the optimum location 116, the MAC algorithm re-calculates the predicted path 113 during the time period and re-determines (step 206) whether any point on the predicted path 113 corresponds to the optimum location 116. The steps of re-calculating the predicted path 113 and determining whether any point on the predicted path corresponds to an optimum location (steps 204, 206) are repeated until either the mobile terminal 110 reaches the optimum location 116 or the MAC algorithm determines that there are no points along the predicted path 113 that corresponds to the optimum location 116. If the predicted path 113 does not comprise any points corresponding to the optimum location 116, the MAC algorithm allocates (step 210) a resource (channel) for communicating the data between the mobile terminal 110 and the first or second Node B 106, 108.

However, if the mobile terminal 110, whilst travelling along the actual path, reaches the optimum location 116, the MAC algorithm allocates (step 210) the resource for communicating the data. In this example, the mobile terminal 110 is better supported by the second Node B 108 than the first Node B 106 when located at the optimum location, the optimum location being optimum by virtue of the proximity of the second Node B 108 to the mobile terminal 110.

In order to assist the MAC algorithm, an electronic map can be used in order to enhance generation of the predicted path 113, for example, the map can be used to resolve a choice of two possible predicted paths, the map enabling one of the possible predicted paths to be discounted.

Although the above example describes the MAC algorithm being supported by the RNC 104, it should be appreciated that the MAC algorithm can be supported by an intelligent network element, for example, the core network 102, the mobile terminal 110 or any other part of the UMTS network 100 (or any other communications network) capable of monitoring communications traffic in a cell/sector supported by the first and/or second Node B 106, 108.

Additionally, it is envisaged that some or all of the functionality of the first and/or second Node B 106, 108 can be performed by a further mobile terminal (not shown). Consequently, the RNC 104 (or other intelligent network entity) can determine the optimum location with respect to the further mobile terminal (not shown) when the further mobile terminal performs some or all of the functionality of the first and/or second Node B 106, 108.

The invention claimed is:

1. A method of transmitting information between a mobile terminal and a communications device, the information having a time period associated therewith corresponding to a tolerable delay for the transmission of the information, the method comprising the steps of:

associating a quality of service (QoS) parameter with a request to transfer information, determining a time period corresponding to an acceptable time delay for the communication of the information, making a prediction of subsequent locations of the mobile terminal to which the mobile terminal is anticipated to move from a previous location during the time period, determining whether a subsequent location is an optimum location with respect to the specified QoS parameter for transmitting the information between the mobile terminal and the communications device, and withholding an allocation of a resource for transmitting the information between the mobile terminal and the communications device until the mobile terminal reaches the optimum location before the acceptable time delay.

2. A method as claimed in claim 1, further comprising the step of:

allocating the resource when the mobile terminal reaches the optimum location.

3. A method as claimed in claim 1, further comprising the step of:

allocating the resource before the expiry of the time period if it is predicted that any subsequent location is not an optimum location.

4. A method as claimed in claim 1, further comprising the step of allocating the resource without delay if it is predicted that there is a degradation in subsequent locations.

5. A method as claimed in claim 4, wherein if the mobile terminal has not reached the optimum location, further comprising the steps of:

re-calculating the predicted path during the time period, and re-determining whether any point on the predicted path corresponds to the optimum location.

6. A method as claimed in claim 1, further comprising the steps of:

predicting a subsequent location of the communications device, and allocating the resource in response to the mobile terminal being at the optimum location as a result, at least in part, of movement of the communications device.

7. A resource controller, the resource controller being arranged to associate a quality of service (QoS) parameter with a request to transfer information, determining a time period corresponding to an acceptable time delay for communication of the information, determine a first location of a mobile terminal and predict subsequent locations of the mobile terminal to which the mobile terminal is anticipated to move from the first location during the time period corresponding to a tolerable delay for the transmission of information between the mobile terminal a communications device, determining whether a subsequent location is an optimum location with respect to the specified QoS parameter for transmitting the information between the mobile terminal and the communications device, wherein the resource controller is arranged to withhold an allocation of a resource for transmitting the information between the mobile terminal and the communications device until the mobile terminal reaches the optimum location before the acceptable time delay.

* * * * *